T. BROWN.
MANURE SPREADER.
APPLICATION FILED APR. 26, 1912. RENEWED OCT. 12, 1916.
1,226,746.
Patented May 22, 1917.
2 SHEETS—SHEET 1.
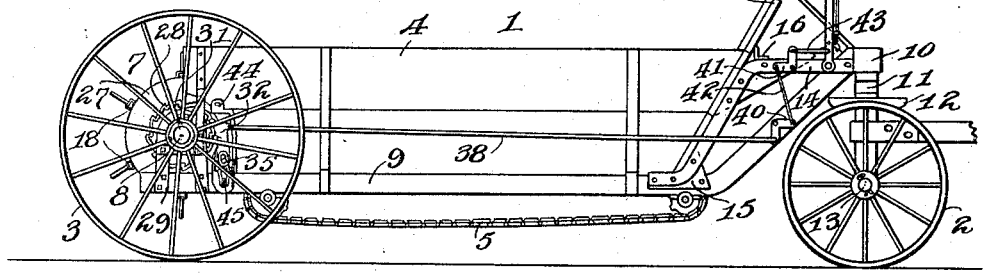
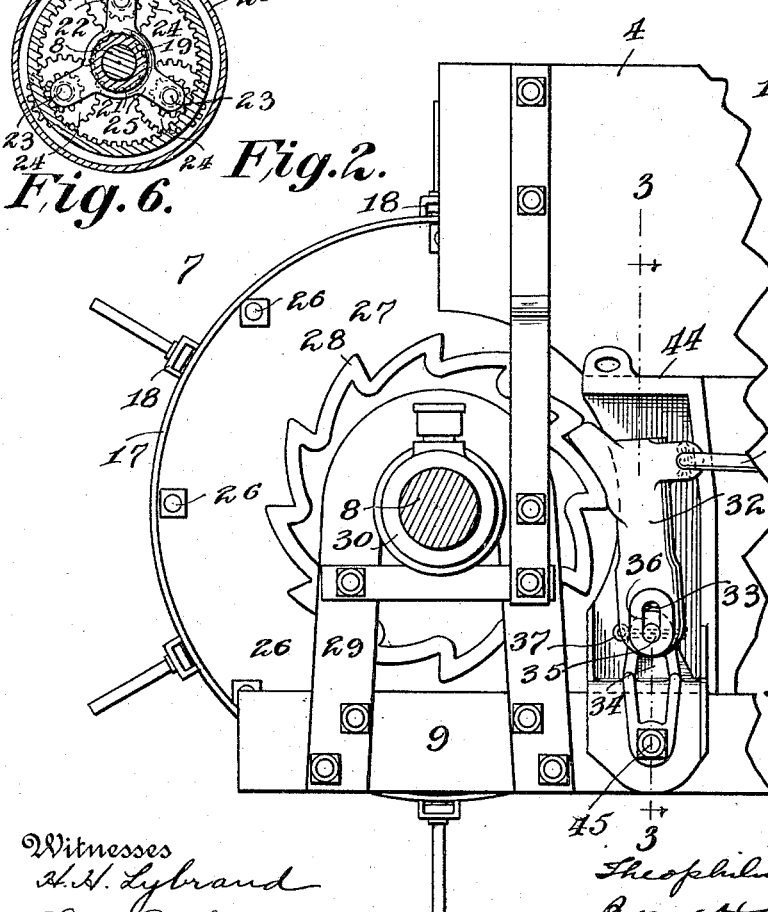
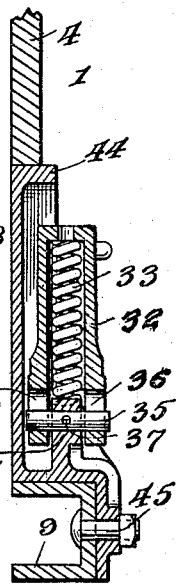
Witnesses
H. H. Lybrand
Stanley W. Cook
Inventor
Theophilus Brown
By H. H. Bliss
Attorney T. BROWN.
MANURE SPREADER.
APPLICATION FILED APR. 26, 1912. RENEWED OCT. 12, 1916.
1,226,746.
Patented May 22, 1917.
2 SHEETS—SHEET 2.
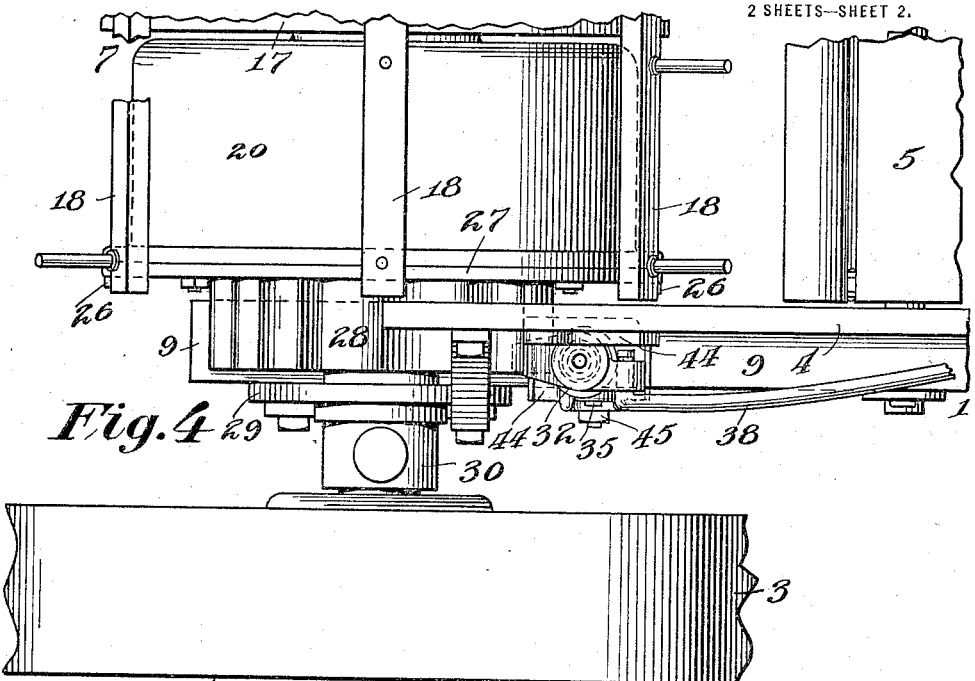
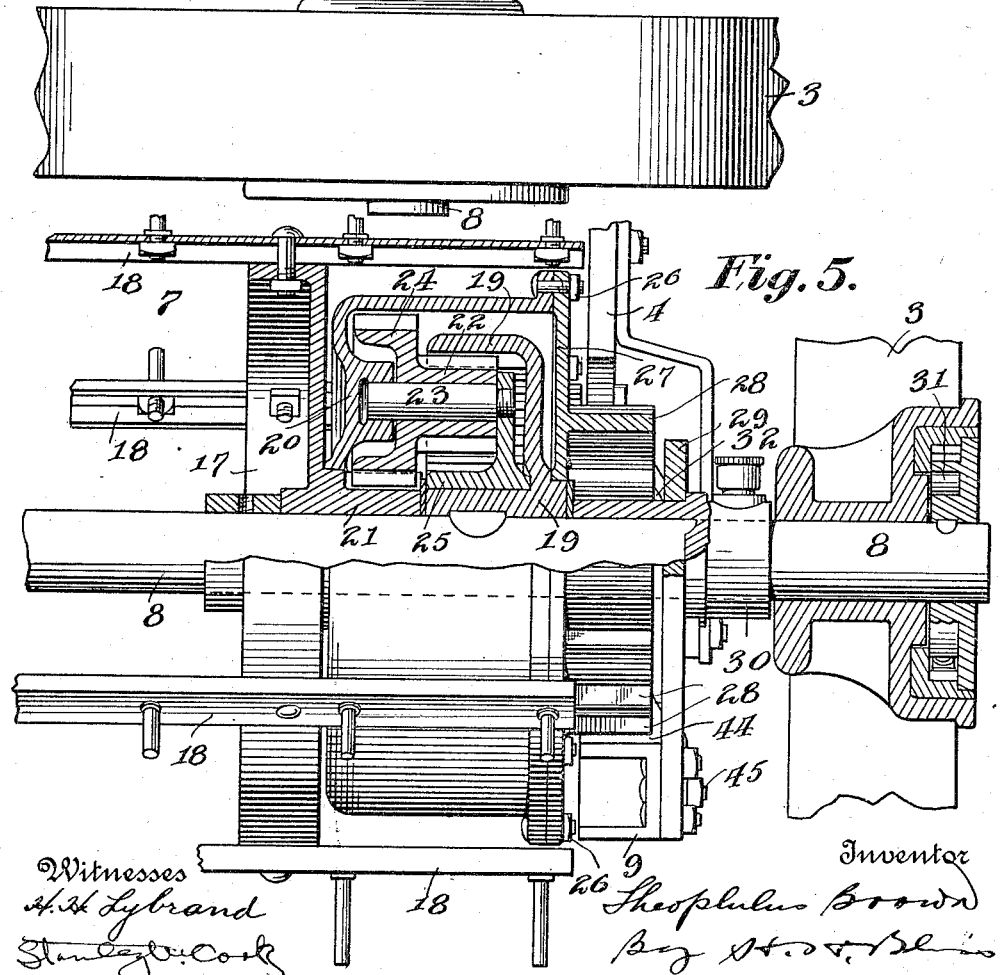

UNITED STATES PATENT OFFICE.

THEOPHILUS BROWN, OF MOLINE, ILLINOIS, ASSIGNOR TO MARSEILLES COMPANY, OF EAST MOLINE, ILLINOIS, A CORPORATION.

MANURE-SPREADER.

1,226,746.  Specification of Letters Patent.  Patented May 22, 1917.

Application filed April 26, 1912, Serial No. 693,430. Renewed October 12, 1916. Serial No. 125,287.

*To all whom it may concern:*

Be it known that I, THEOPHILUS BROWN, a citizen of the United States, residing at Moline, in the county of Rock Island and State of Illinois, have invented certain new and useful Improvements in Manure-Spreaders, of which the following is a specification, reference being had therein to the accompanying drawing.

This invention relates to improvements in fertilizer distributers, and in particular to that class of machines which in general consists of a body part carried by suitable ground wheels, a movable bottom for advancing the load to the rear of the machine and a rapidly rotating beater which disintegrates and spreads the load upon the ground.

In the drawings,

Figure 1 is a side elevation of a fertilizer distributer.

Fig. 2 is a fragmentary side elevation of the rear part of the vehicle with the ground wheel removed.

Fig. 3 is a vertical sectional view on the line 3—3 of Fig. 2.

Fig. 4 is a partial plan view showing the rear portion of the machine at the beater driving end of the axle.

Fig. 5 is a rear view of the beater driving end of the machine, the lower half being an elevation and the upper half a vertical section through the axle.

Fig. 6 is a section through the gearing.

Referring to the drawings, the numeral 1 indicates in general the body part or the load-carrying chamber which is supported at its forward end by ground wheels 2 and at its rear upon ground wheels 3. The body part 1 comprises the vertical side boards 4, the movable bottom 5 and the sloping front board 6. The rear of the chamber is limited by the front portion of the beater 7 which is mounted concentric with the rear axle 8 which in turn is carried by the ground wheels 3.

The sides, bottom and front end of the load-carrying chamber are supported upon two continuous sills 9 which extend from beneath the rear axle forward and are curved upwardly at their front ends to points above the tops of the front wheels 2. The front ends of the sills are secured by brackets 10 to a heavy cross piece 11. This cross piece is secured upon the fifth wheel 12 the lower part of which carries the front axle 13.

Angular brackets 14 extend horizontally rearward a short distance from the brackets 10 and are then inclined sharply downward and joined at their lower ends to the sills 9 by means of plates 15. These brackets 14, together with a transverse iron 16, form the support for the sloping front board 6. By using the inclined brackets and front board the body of the load is extended forward a considerable distance without interfering with the undercut of the front wheels, the slope of the front board being such that the material will easily slide downward upon the rearwardly moving apron.

The rear ends of the sills 9 are supported from the rear axle 8 by means of brackets 29, the upper portions of which encircle bearings 30.

The rear ground or driving wheels are loosely mounted upon the ends of the axle and are provided with ratchet devices 31 through which they drive the axle in a forward direction only.

Any suitable mechanism of well known form may be employed for driving the slowly moving apron or bottom 5 which advances the load rearward until it impinges upon the teeth of the beater 7.

The numeral 7 indicates a rotatable beater mounted concentric with the rear axle and comprising two cylindrical heads 17 free to revolve around the axle, the heads carrying a series of toothed bars 18 extending across their peripheries. The beater must necessarily be rotated at a high rate of speed in a direction opposite to the direction in which the rear axle turns, and for the purpose of transmitting this rotation from the axle to the beater, I have employed a type of planetary gearing.

At the beater driving end of the axle the head 17 is placed inward on the axle a short distance from the ends of the bars 18 so that the transmission gear may be placed within this space and thus be located entirely within the confines of the beater. The transmission comprises the three distinct elements, namely, the driving gear 19 keyed to the axle 8, the set of intermediate gears carried upon the intermediate plate 20 and a driven gear 21 secured to the beater head 17. In order that the increase of speed from the axle to the beater may be as great as possible, I have in this case provided small pinions 22 mounted on stub shafts 23 upon the other ends of which are mounted larger pinions 24 which engage the driven gear 21, the smaller pinion 22 meshing with the driving gear. These stub shafts 23 are carried at one end in the intermediate plate 20 which is extended out and over the entire gearing in the nature of a drum, the other ends of the stub shafts being mounted in a bracket 25 which is free to rotate upon the hub of the driving gear 19. Since it is necessary to stop the intermediate drum 20 from rotation when power is to be transmitted from the driving to the driven gears, I have secured by means of bolts 26 a plate 27 upon the outer edge of the intermediate drum 20, and form integral therewith a series of ratchet teeth 28.

When a pawl or dog of the ordinary type is used to engage with the ratchet teeth 28, on its being thrown into engagement with the ratchet the heavy beater is brought up to full speed almost instantaneously. This action throws a very heavy and injurious shock upon the machine as well as the necks of the horses. To eliminate this trouble I have provided a dog 32 which is formed hollow to receive a heavy coil spring 33. The lower end of this spring abuts against a lug 34, a pin 35 passing through both the lug and the lower end of the dog and serving as a pivot. The opening 36 in the dog through which the lug 35 passes is vertically slotted so that the dog may have a vertical movement when the spring is compressed. A cotter or other type of pin 37 passes through the lug and pin 35 to hold the same in place. 38 is an operating rod pivoted to the upper end of the dog and extending forward to the front of the machine and is connected with an operating lever 39 by means of two bell cranks 40, 41, and two rods 42 and 43. By operating the lever 39 the dog 32 will be thrown into or out of contact with the ratchet 28 thereby starting or stopping the action of the beater.

Since the entire beater driving mechanism is entirely within the confines of the beater, it is likewise within the planes of the side boards 4. The ratchet teeth 28 therefore extend outward but a slight distance and the dog 32 is thus located within a sort of chamber formed by a bracket 44 upon the lower part of which is formed the lug 34. This bracket is mounted within an opening cut from the rear end of the side board 4 and is secured at its lower end to the sill 9 by means of a bolt 45.

The spring dog or yieldable stop is located to co-act with the intermediate drum of the planetary transmission gearing so that the action of a stiff coil spring having a comparatively short action and located in the stop, will result in a multiplication of its resiliency to a very considerable arc on the periphery of the beater. This multiplication in the effect of the spring is due to the fact that in this train of gearing, deriving its power from the ground wheels and transmitting it at an increased angular velocity to the beater, the intermediate drum when free to rotate and no power is being transmitted, the beater being stationary, travels at an angular velocity considerably less than that of the beater when power is being transmitted to the beater and the drum is held stationary. With a planetary transmission of this class the transmission of power is started or stopped by stopping the intermediate drum or by allowing it to revolve freely. When the drum is free to revolve and the resistance at the driven gear is greater than the frictional resistance in the transmission itself, no power will be transmitted, but when this intermediate drum is prevented from rotating, the axes of the small intermediate pinions instead of rotating about the centers of the driving and driven gears will be held still and the rotation of the driving gear therefore transmitted through them to the driven gear. I have placed this resilient element in the power transmission gearing at a point where its effect will be greatly multiplied before reaching the teeth of the beater or conversely, since in practice the beater is the part that is directly affected by a sudden load being thrown upon the gearing, this structure is permitted to slow up or even stop for a short time while the driving torque is greatly increasing until the spring pawl has been compressed to its limit at which point the maximum power obtainable at the ground wheels will be transmitted through the beater.

By providing this spring pawl in connection with the planetary system of transmission in a manure spreader, I have relieved the entire structure of the severe shocks which are incident to the sudden starting of the beater, and also the strains resulting from a sudden overload being thrown upon the beater, as, for example, when the teeth encounter an unusual soggy mass, or a frozen lump of manure. This cushioning of the driving connection likewise relieves the necks of the horses of a very severe strain which necessarily results from sudden starting or overloading of the beater when a dog of the old type was used.

The pivot pin 35 secured in the lug 34 passes through the two vertical slots 36 in the hollow dog 32. The spring 33 located within the dog presses downward against the lug 34 forcing the dog 32 to its highest position. The upward motion of the dog is limited or stopped by the pin 35 contacting with the lower ends of the slots 36. On the other hand, when a considerable force is brought to bear upon the upper end of the dog, the spring is gradually compressed as the dog is forced to its lowest position at which point it is stopped by the upper edges of the slot 36 contacting with the pin 35. The dog is by this arrangement of parts vertically movable between certain fixed limits. When the upper end of the dog is thrown into contact with the teeth 28 on the intermediate drum of the planetary transmission, the sudden starting shock is taken up in compressing the spring 33 within the dog and forcing the dog downward until it is stopped by the pin 35 contacting with the upper ends of the slots in the dog. When the dog is forced downward to the limit of its travel, the intermediate drum is positively stopped from rotation and the full power obtainable at the wheels is transmitted to the beater. As the starting force necessary to overcome the inertia of the heavy parts of the beater and bring it up to normal working speed lessens, the force necessary to keep the intermediate drum from rotating becomes proportionately smaller. The spring 33 then gradually forces the dog upward until stopped by the pin 35 or until it reaches a point where the force on the end of the dog and the force exerted by the spring balance each other. When sudden loads are thrown upon the beater as previously described, the dog will be forced downward upon the spring and should the load be great enough, the dog will be pushed to its lowest limit until stopped by the pin 35 in which position the maximum driving torque will be transmitted from the wheels to the teeth of the beater. Other attempts at providing a resilient beater drive have resulted in arrangements by which a wavering flexible drive is given to the beater without any positive limitation to the resiliency of the transmission beyond which point the maximum driving torque is transmitted. The dog and its pivot pin or stop 35 is mounted directly upon and in the vertical plane of the side still adjacent the transmission end of the beater.

What I claim is:—

1. The combination of the vehicle body, the rotary beater, feeding means adapted to maintain a substantially constant load on the beater, a power transmitter for rotating the beater comprising two constantly-engaging toothed gear elements of which one is a continuously rotating primary driver and the other is a secondary power-receiving element connected with the beater by devices adapted to transmit power thereto, both the primary and the secondary elements being adapted to be idle relative to the driving of the beater while the primary element is rotating, and a yielding stop for the secondary element, said parts being arranged substantially as described, whereby the beater is started at an initially slow speed and is caused to rotate with an increasing speed after its rotation commences.

2. The combination of the vehicle body, the rotary beater, means for advancing the load against the beater, a power transmitter for driving the beater comprising a constantly-rotating primary drive element, a power-receiving element rigidly connected with the beater, an intermediate power-transmitting element, power-transmitting means which constantly connect said intermediate element with both of the aforesaid elements, the intermediate element being adapted to normally rotate bodily with the primary drive element while the beater is stationary, and optionally-controlled means adapted to positively engage with the intermediate element and yieldingly retard and stop it from rotating bodily.

In testimony whereof I affix my signature, in presence of two witnesses.

THEOPHILUS BROWN.

Witnesses:
FLOYD R. TODD,
H. B. McKALIM.

Copies of this patent may be obtained for five cents each, by addressing the "Commissioner of Patents, Washington, D. C."